United States Patent [19]

Pincon

[11] 4,124,467
[45] Nov. 7, 1978

[54] METHOD AND APPARATUS FOR PRODUCING OZONE

[76] Inventor: Andrew J. Pincon, 331 Wallace Rd., Marietta, Ga. 30060

[21] Appl. No.: 645,363

[22] Filed: Dec. 30, 1975

[51] Int. Cl.² ........................... B01J 1/10; B01K 1/00
[52] U.S. Cl. ............................... 204/157.1 R; 250/527
[58] Field of Search ................. 250/527; 204/157.1 R, 204/157.1 H

[56] References Cited

U.S. PATENT DOCUMENTS

| | | | |
|---|---|---|---|
| 1,969,655 | 8/1934 | Mailey | 250/527 |
| 2,937,983 | 5/1960 | Ryan | 250/527 |
| 3,711,387 | 1/1973 | Kasametsu et al. | 204/157.1 H |

OTHER PUBLICATIONS

Chemical Engineering, Feb., 1955, pp. 164-165, 174-175.

Chem. Abstract, vol. 66, 1967, Par. 22088Z — Beller et al.

Chem. Abstract, vol. 74, 1971, Par. 57116Z — Steinberg et al.

*Primary Examiner*—Howard S. Williams
*Attorney, Agent, or Firm*—Jones, Thomas & Askew

[57] ABSTRACT

Apparatus for producing ozone including a casing through which oxygen is passed, and a supply of radiant energy for converting the oxygen to ozone as the oxygen traverses the casing. One form of radiant energy is ultra violet light produced by lamps within the casing, the lamps comprising fluorite tubes filled with deuterium and/or xenon, and another form of radiant energy is gamma radiation from a radioactive source. The disclosure further includes means for treating water with the ozone in which the water and ozone are directed through a pipe while the dipoles of ozone are aligned by a magnetic field in the pipe.

7 Claims, 7 Drawing Figures

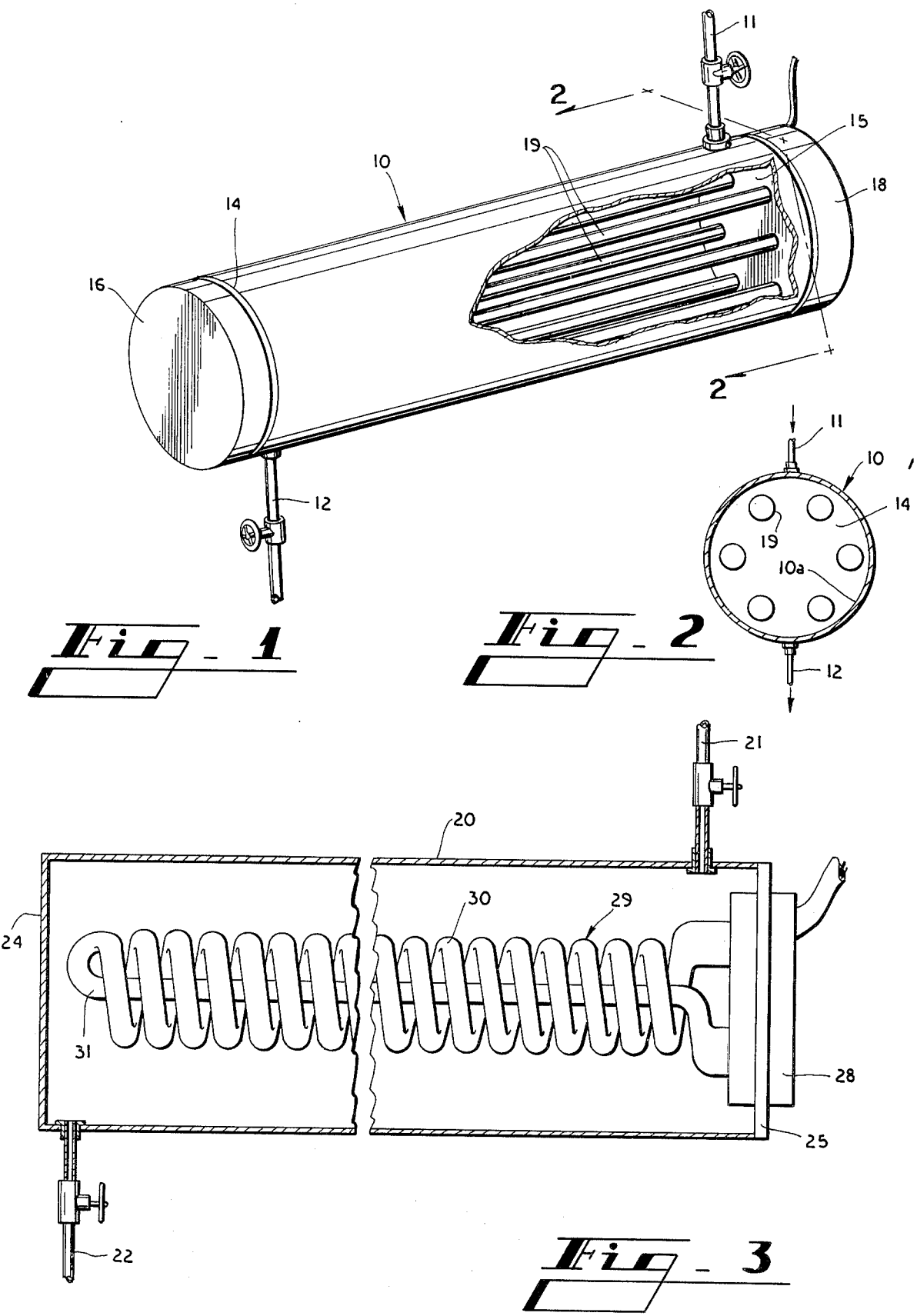

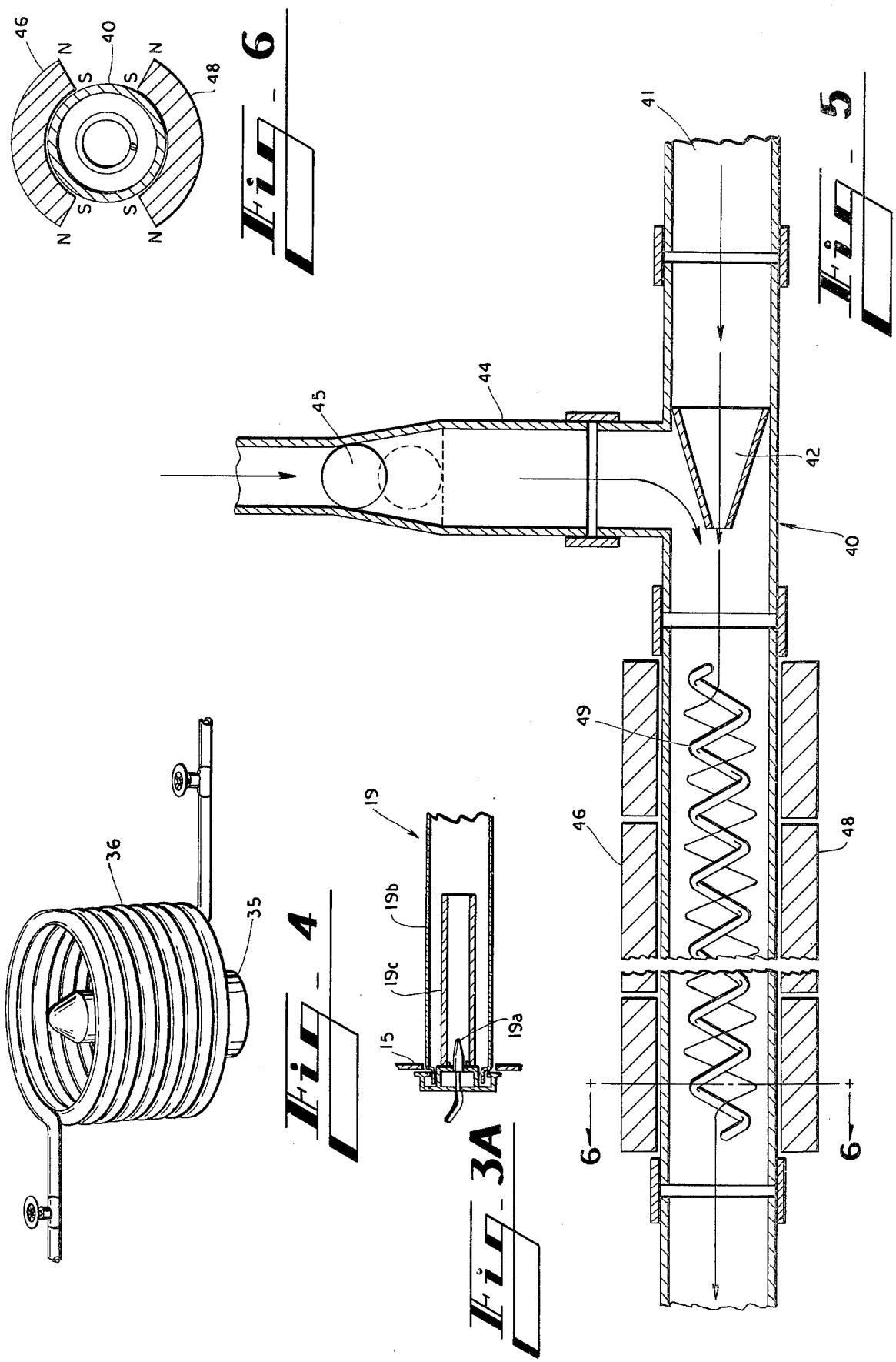

METHOD AND APPARATUS FOR PRODUCING OZONE

This invention relates to the purification of water by treatment with ozone, and is more particularly concerned with a method and apparatus for the controlled production of ozone by direct energy input.

It is well known that ozone is an oxidizing agent that is useful as a germicide, bacteriacide or general antiseptic. Further, ozone or ozonized air has been used in the purification of water.

The production of ozone has been carried out in the prior art by subjecting a stream of air or oxygen to an electric discharge. This means of putting energy into oxygen causes at least some of the atoms of oxygen to combine into ozone. The principal difficulty with the prior art production of ozone is the cost of producing even a low-concentration ozonized air. The cost tends to be prohibitive in large commercial uses such as in the purification of water, because of the electrical power requirements. Electrical discharge ozone production also produces nitrous oxide, which is corrosive and must be removed by dryer and filter equipment especially provided for the purpose.

The method and apparatus of the present invention overcomes the above mentioned and other difficulties with the prior art production and utilization of ozone by providing a closed path along which is directed air or oxygen. As the gas moves along the closed path, it is bombarded with energy in the form of radiation of a predetermined frequency. While the invention includes the selection of a wavelength for optimum production of ozone, the invention also includes the concept that less-than-optimum ozone output may be selected where a less-concentration ozonized air is desired. Further, the invention includes the use of an extremely high energy radiation when the use of such a radiation source is more economically feasible, but the use of such a high energy source generally requires the use of oxygen rather than air.

The primary energy source here contemplated is radiation in the range referred to as ultraviolet light. In this connection it should be pointed out that the present invention includes apparatus for the production of ultraviolet light of the selected wavelength to yield the desired production of ozone.

These and other features and advantages will become apparent from consideration of the following specification when taken in conjunction with the accompanying drawings in which:

FIG. 1 is a perspective view of one form of apparatus made in accordance with the present invention for the production of ozone through the use of ultraviolet radiation;

FIG. 2 is a cross-sectional view taken substantially along the line 2—2 in FIG. 1;

FIG. 3 is a longitudinal cross-sectional view of a modified form of the apparatus shown in FIGS. 1 and 2;

FIG. 3A is a fragmentary cross-sectional view of a modified lamp providing shielding against unwanted x-ray emanations.

FIG. 4 is a perspective view of apparatus made in accordance with the present invention for the production of ozone through the use of a radio-active source of energy;

FIG. 5 is a schematic illustration showing apparatus for mixing ozone with water for the purification of the water; and, FIG. 6 is a cross-sectional view taken substantially along the line 6—6 in FIG. 5.

Referring now more particularly to the drawings and to those embodiments of the invention here chosen by way of illustration, the device shown in FIGS. 1 and 2 of the drawings includes casing 10 having an inlet 11 and an outlet 12. The casing 10, with the inlet 11 and outlet 12 defines a path along which air or oxygen moves while being subjected to energy so that ozone or ozonized air will be discharged from the outlet 12.

Those skilled in the art will understand that oxygen comprises approximately 20% of the volume of air, and that air is frequently used in lieu of pure oxygen when the low concentration of oxygen does not militate against the desired result. Thus, for convenience in discussing the present invention, the oxygen will be discussed without regard to whether the oxygen is in its pure form or is in a dilute form such as in air. When there is an important difference between the result achieved with pure oxygen and the result achieved with a dilute mixture of oxygen, the differences will be discussed in detail.

Returning now to FIG. 1 of the drawings, it will be seen that the casing 10 is substantially cylindrical, and is formed of sheet material so the inside of the casing is open, and the two ends are closed by end walls 14 and 15. Adjacent to the end wall 14, there is housing 16, and adjacent to the end wall 15 there is a housing 18. The two housings 16 and 18 enclose appropriate wiring and a plurality of sockets for receiving the electrical connections for a plurality of tubular lamps 19.

The general form of lamps such as the lamps 19 is well known to those skilled in the art, so no detailed showing of the construction is here presented. The lamps are of the type wherein an electric arc is passed from an electrode in one end of a tube to an electrode in the opposite end of the tube. A gas is present within the tube, and the bombardment of the gas by electrons causes the electrons in the atoms of gas to move out to a higher energy level, and to return to their normal energy state, giving up energy as they do so. It is also known by those skilled in the art that different gasses surrender their energy in different wave lengths so that a particular wave length of energy can be obtained through selection of the proper gas to be bombarded.

Besides producing energy in the desired wavelength, it is necessary to provide a tubular envelope for the lamp which will allow the energy to pass through the envelope for utilization outside the envelope. It will be understood that numerous minerals and types of glass are known, one of which can be selected to be transparent to the desired wavelength of energy.

With this background, attention is again directed to FIGS. 1 and 2 of the drawings. The object of the device is to admit oxygen through the inlet 11 and allow the oxygen to traverse the casing 10 while the oxygen is bombarded by energy from the lamps 19; then, the resulting ozone is discharged through the outlet 12. The maximum ozone production is obtained with a wave length of about 1000 angstrom units (Å), and this wave length will be produced when the tubes of the lamps 19 are filled with deuterium. Also, the wavelength of about 1000Å will readily pass through a tube made of fluorite glass.

The casing 10 has a plurality of lamps 19 extending therethrough, parallel to the axis of the cylindrical casing. As here shown, there are six lamps generally equally spaced around a circle. While the precise number of lamps is not important, the object is to provide enough lamps to give the desired energy input for the apparatus, and to have generally uniform energy distribution throughout the casing 10 so all oxygen will receive the required amount of energy to make the change from molecular oxygen to ozone. To assure greater utilization of the energy from the lamps 19, the interior wall 10a of the casing 10 is specular aluminum. The specular quality causes the energy to be reflected inwardly for greater conversion of oxygen to ozone, and the use of aluminum prevents corrosion of the casing by the resulting ozone.

When the lamps 19 are made of fluorite glass and the tube is filled with deuterium gas, passing an electric arc through the tube will produce energy having a wave length of about 1000Å, and the fluorite glass tube is virtually transparent to this particular wave length. As a result, energy having a wave length of about 1000Å will be propagated from each of the lamps 19 and will be reflected when it engages the specular surface of the casing 10. Oxygen passed through the casing 10 under these conditions will be bombarded by the energy and will be changed from molecular oxygen to ozone.

It should be pointed out that the energy required to convert molecular oxygen to ozone is equal to 7.9 electron volts per cycle of the radiant energy used. This energy is equivalent to a wave length of about 1300Å. It will be realized, however, that the 7.9ev is the energy actually used for the conversion, and some additional energy needs to be provided because one cannot expect complete efficiency. Thus, the 1000Å wavelength has been found to produce the maximum ozone, even though its energy is about 12.3ev per cycle.

While the above discussion has been directed to means for obtaining the maximum amount of ozone in any given volume of oxygen, it is sometimes desirable to produce less ozone for a particular end use of ozonized air, for example. To reduce the percentage of ozone produced, it has been found that xenon gas used in lieu of deuterium will produce an energy wavelength that will provide less ozone; and, it will be readily understood that mixtures of xenon and deuterium will produce varying amounts of ozone depending on the proportions. Further, it is known that calcite and sapphire transmit energy in the ultra-violet range of frequencies, and can be used instead of fluorite as the tubular enclosure. Also, when air or other gas mixtures are used rather than pure oxygen, it may be necessary to reduce the energy input to minimize the formation of undesirable ions or compounds. In using air, the molecular nitrogen is somewhat ionized and tends to combine with the ozone and hydrogen to produce nitric acid. Less energy input reduces the chances for ionization of nitrogen, hence for formation of nitric acid.

Attention is next directed to FIG. 3 of the drawings which shows a modified form of the apparatus shown in FIGS. 1 and 2. In FIG. 3 there is a casing 20 having an inlet 21 and an outlet 22. There is an end wall 24 at one end of the cylindrical casing 20 and a wall 25 at the opposite end of the casing 20, the wall 25 comprising a socket 28 for the lamp 29.

It will therefore be seen that the difference between the embodiment of the invention shown in FIGS. 1 and 2 and the embodiment shown in FIG. 3 is in the lamps 19 and 29. In the embodiment of FIG. 3, there is a single lamp 29 but the single lamp is helical as shown at 30 with a center return shown at 31. As a result, there is a sufficient length of the lamp 29 to provide enough energy within the casing 20. Those skilled in the art will understand that the energy output from the lamp 29 is dependent on the total electrical energy passed through the lamp and the total quantity of gas within the lamp.

Lamps which are filled with a mixture of deuterium and xenon gases may emit radiation in the x-ray range, at or near the cathodes of the lamps. Such production of x-rays may be contrary to regulations governing the emissions of x-ray radiation, and will in time produce microscopic holes in the lamp glass with resulting loss of the gas which is contained within the lamp. Such unwanted x-rays are blocked with shielding as shown in FIG. 3A, wherein a typical lamp 19 has a lamp cathode 19a which is surrounded by a hollow tubular shield 19c within the lamp glass 19b. The shield 19c is made of a suitable x-ray shielding material such as lead ceramic or the like, and extends along the length of the lamp 19 a sufficient distance to shield x-ray emissions caused by the heated lamp cathode.

Looking now at FIG. 4 of the drawings, it will be seen that the present invention also contemplates the use of higher energy, or shorter wavelength, radiation. FIG. 4 illustrates the use of a radioactive source of energy, the radiation being in the form of gamma rays.

Because of the inherently high energy output from a radioactive source, it is contemplated that only oxygen will be used in the apparatus of FIG. 4, since the energy level will tend to ionize other constituents of a gas mixture so that undesirable compounds are quite likely to form. Also because of the inherently high energy output from a radioactive source, it is contemplated that somewhat "waste" sources will be used. One example of such "waste" source is Cesium 137, though of course other material can be used.

FIG. 4 illustrates somewhat generally a radioactive source 35, the source 35 being surrounded by a casing 36 through which oxygen is passed. The casing 36 is in the form of a helical tubing wound around the source 35 to provide enough length for the oxygen within the casing 36 to receive the energy required to convert the oxygen to ozone. Since the source 35 will emit high energy radiation, probably in the gamma ray spectrum, the oxygen can be moved through the casing 36 at a relatively high speed; however, if pure oxygen is used, there is no harm in an overdose of energy.

While no particular shielding or other structure is shown in conjunction with the apparatus of FIG. 4, is will be understood that conventional apparatus would be used. The source 35 and the casing 36 can be placed within a shielded enclosure using lead or the like. Alternatively, the entire apparatus can be in a swimming pool reactor so that the source 35 is in the swimming pool, and heavy water is present as a moderator between the source 35 and the casing 36. Other physical arrangements will suggest themselves to those skilled in the art.

Looking at FIGS. 5 and 6 of the drawings, it will be seen that apparatus is provided for using the ozone supplied from one of the apparatuses previously described for the treatment of water to purify the water.

In general, it will be seen that there is a pipe 40 having a supply of impure water at one end 41 connected through a siphon valve 42. Perpendicular to the pipe 40 and in communication therewith, there is an ozone inlet 44 having a check valve 45 therein to prevent water from entering the casing 10, 20 or 36 where ozone is produced.

Thus, impure water will enter from the supply 41, through valve 42, and ozone will be introduced at the valve 42. The water and ozone will both be introduced into the pipe 40 where the ozone is to be intimately mixed with the impure water to purify the water.

To assist in the mixing of the ozone with the water, the pipe 40 is made of polyvinyl chloride or other non-magnetic material, and a pair of magnets 46 and 48 is placed against the pipe 40 with the same pole of each magnet against the pipe. Thus, the pipe 40 will have (for example) opposed South poles diametrically opposite each other. Further, there is a spiral mixer 49 mounted axially of the pipe 40. The spiral mixer 49 is made of stainless steel or other such substance that provides the required structural strength and is not corroded by the fluids passing through the pipe.

In operation, it will be understood that since ozone is paramagnetic, the ozone will tend to align with the lines of magnetic force. Due to the arrangement of the magnets 46 and 48 the lines of magnetic force will extend from the South poles of the magnets 46 and 48 substantially to a horizontal diameter of the pipe 40 so that there will be a very high concentration of lines of force between the extremities of the magnets 46 and 48. The ozone will therefore tend to remain in a fixed attitude while the water is caused to rotate, or swirl, due to the action of the spiral mixer 49.

To assist further in the mixing of the water and air, it will be understood that water normally dissociates into hydrogen and hydroxyl ions. When the strong magnetic field is placed through the water, the ions will tend to migrate to their opposite polarity which tends to reduce the surface tension of the water and enhance the micibility of ozone and water.

In view of the combination of the spiral mixer 49 to cause the water to rotate or swirl through the pipe 40 and the strong magnetic field to cause the ozone to tend to retain a fixed attitude, the water is thoroughly mixed for intimate contact with the ozone. This results in thorough treatment of the water.

The above discussion assumes the apparatus is in the Northern Hemisphere where the North Magnetic Pole is dominant. It should be understood that, in the Southern Hemisphere, the South Magnetic Pole is dominant so the North Pole of the magnets would be placed against the pipe. Moreover, one can use electromagnets rather than permanent magnets if desired. The electromagnets should have a pulsating field of constant polarity selected with respect to the hemisphere of operation, as aforementioned, rather than an alternating polarity. It has been experimentally observed that a pulsating intensity of the same polarity produces especially desirable results when the frequency of the pulsations is around 160 to 180 pulsations per sencond.

It will of course be understood that the particular embodiments of the invention are here shown by way of illustration only, and other embodiments of the same invention are equally encompassed, as described in the accompanying claims.

I claim:

1. Apparatus for producing ozone, comprising a casing, an inlet for introducing oxygen into said casing, an outlet for discharging ozone from said casing, at least one lamp within said casing, said lamp comprising a tube filled with a gas and means for passing an electric current through said gas, said tube being transparent to a selected wavelength of radiant energy, said selected wavelength of radiant energy being produced by said gas, and said gas being selected from the group consisting of deuterium, and mixtures of deuterium and xenon.

2. Apparatus as in claim 1, wherein said tube is made of sapphire.

3. Apparatus according to claim 1, said casing being substantially cylindrical, said inlet being located adjacent to a first end of said casing, said outlet being located adjacent to the opposite end of said casing, and said at least one lamp extending generally from said first end to said opposite end.

4. Apparatus as in claim 1, wherein said gas comprises deuterium and said tube is made of sapphire.

5. Apparatus according to claim 1, said tube being made of a material selected from the group consisting of fluorite, calcite and saphire.

6. The method of producing ozone, comprising the step of subjecting oxygen to the radiation emitted by ionized gas selected from the group consisting of deuterium, and mixtures of deuterium and xenon.

7. The method as in claim 6, wherein said oxygen is subjected to radiation emitted by ionized deuterium gas.

* * * * *